US009622094B2

(12) United States Patent
Siradjev

(10) Patent No.: US 9,622,094 B2
(45) Date of Patent: Apr. 11, 2017

(54) SELF-OPTIMIZING COMMUNICATION NETWORK WITH CRITERIA CLASS-BASED FUNCTIONS

(71) Applicant: Djakhongir Siradjev, Istanbul (TR)

(72) Inventor: Djakhongir Siradjev, Istanbul (TR)

(73) Assignee: P.I. Works TR Bilisim Hizm. San. Ve Tic A.S., Istanbul (TR)

( * ) Notice: Subject to any disclaimer, the term of this patent is extended or adjusted under 35 U.S.C. 154(b) by 78 days.

(21) Appl. No.: 14/566,888

(22) Filed: Dec. 11, 2014

(65) Prior Publication Data

US 2016/0174080 A1 Jun. 16, 2016

(51) Int. Cl.
*H04W 24/02* (2009.01)
*H04L 12/803* (2013.01)
*H04W 36/00* (2009.01)

(52) U.S. Cl.
CPC .......... *H04W 24/02* (2013.01); *H04L 47/125* (2013.01); *H04W 36/0083* (2013.01)

(58) Field of Classification Search
CPC . H04W 24/02; H04W 24/10; H04W 36/0083; H04W 24/08; H04W 36/0055
See application file for complete search history.

(56) References Cited

U.S. PATENT DOCUMENTS

| 7,577,103 | B2 | 8/2009 | Diaz et al. | |
|---|---|---|---|---|
| 2013/0031036 | A1* | 1/2013 | Kojima | G06N 99/005 706/12 |
| 2013/0122885 | A1* | 5/2013 | Kojima | G05B 23/0251 455/418 |
| 2015/0023209 | A1* | 1/2015 | Gunnarsson | H04W 24/02 370/254 |
| 2015/0044974 | A1* | 2/2015 | Futaki | H04W 24/02 455/67.11 |
| 2015/0189533 | A1* | 7/2015 | Fehske | H04W 16/18 370/229 |

OTHER PUBLICATIONS

Schmelz et al., "A Coordination Framework for Self-Organisation in LTE Networks", 12th IFIP/IEEE International Symposium on Integrated Network Management, 2011, p. 193-200, IEEE.
Koutsouris et al., "Conflict free coordination of SON functions in a Unified Management Framework—Demonstration of a proof of concept prototyping platform", IFIP/IEEE International Symposium on Integrated Network Management: Demonstration Session Paper, 2013, p. 1092-1093, IEEE.
Bandh et al., "Policy-based Coordination and Management of Son Functions", 12th IFIP/IEEE IM: Application Session, 2011, p. 827-840, IEEE.
3GPP, "ETSI TS 133 500 Technical Specification", Feb. 2010, version 9.0.0, release 9, ETSI.
3GPP, "ETSI TR 136 902 Technical Specification", May 2011, version 9.3.1, release 9, ETSI.

* cited by examiner

*Primary Examiner* — Jung Park
(74) *Attorney, Agent, or Firm* — Intrinsic Law Corp.

(57) ABSTRACT

The present disclosure is directed to a self-optimizing network (SON) and ways of designing and operating the SON to achieve maximum efficiency and best subscriber experience metrics. Aspects of the invention use criteria classes and class-based self-optimizing network functions in a SON of a wireless communication architecture, apply filtering criteria to said criteria classes and determine worst-performing network objects or relations by coordination of multiple SON functions and function rules.

7 Claims, 6 Drawing Sheets

SELF-OPTIMIZING COMMUNICATION NETWORK WITH CRITERIA CLASS-BASED FUNCTIONS

TECHNICAL FIELD

The present disclosure generally relates to the field of mobile communication systems. More specifically, the present invention relates to dynamically improving or optimizing the performance and robustness of such networks using unified criteria classes of self-optimization functions in a self-optimizing network.

BACKGROUND

Implementing a mobile communication systems (MCS) in real life environments is a challenging and complex undertaking. All together, the infrastructure and devices and techniques used to interconnect the parts of the system can be referred to as a MCS. A primary goal of MCS system designers and operators is to implement and operate the MCS system in the most reliable, robust and efficient manner so as to serve the largest number of customers with the highest level of quality at a most cost effective rate.

The complexities of designing and operating communications networks can be attributed to a number of factors. One set of factors includes the physical communication channels in the presence of urban structures, natural terrain, atmospheric variations and other environmental factors. Another set of factors arises from the engineering systems needed to support wireless communications over useful ranges, which includes the antenna designs and placements, communication base station hardware and software, wired communication infrastructure, switching and other maintenance and upkeep factors. Yet another set of factors arises from the mobile wireless devices and their sheer numbers in some areas, each requiring real-time and acceptable quality of service around the clock.

One type of MCS is a cellular telephone communication system and network, which varies from region to region but shares some physical and design and performance features. Cellular communication systems generally include a network of base stations including telephony processors and servers connected to physical antenna installations. The antenna installations permit over the air wireless communication with suitably equipped and subscribing customers. In most or all cases, a mobile communication device can continue a communication session even when traversing from one cell of the cellular network to another, using established hand-off methods. A well designed and operated cellular system offers consistent good quality communication with few loss-of-communication problems (dropped calls) or disruptions due to hand-off events, interference, fading or other noise generating factors. The settings of various controlling parameters in mobile MCS significantly affect various dimensions of performance of mobile devices, which are connected to and utilize the services provided by the MCS. Mobility Robustness Optimization (MRO), Mobility Load Balancing (MLB), Coverage and Capacity Optimization (CCO) Self-Optimization functions as applied to a heterogeneous MCS are designed to adapt network configuration to changes in user traffic and mobility patterns automatically, to provide the most efficient usage of network resources, and to ensure the best quality-of-service.

Those skilled in the art are familiar with the concept of self-optimizing networks (SON), sometimes referred to as self-organizing networks. A SON is configured using functions and by setting parameters to control the specific operation of the network. Different SON functions may overlap in control parameters, which are changed to cause the desired effect on the performance of the MCS. Conflicts in the application of such changes made by separate SON functions need to be avoided in order to prevent disruptive effect to each other. Applying multiple SON functions on the same cell or cell relation can cause network degradation.

In some existing implementations, a straightforward solution was to isolate geographical regions selected for simultaneous operation of SON optimization functions. However, this results in an isolation with a very coarse geographic granularity, and does not allow utilizing the full power of multiple optimizer functionality. Coarse granularity of optimization results in reduced efficiency of deploying SON into the MCS cellular network and the benefits obtained from utilizing SON will not justify actual cost of deploying SON solution.

In another existing implementation, strict priority-based policies between SON functions cannot provide fine-grained optimization as a highest-priority function. These implementations preempt low-priority functions. Systems with required alignment between SON functions fail to provide the abstraction for higher level configuration of the coordination between SON functions and need fine-tuning of initial settings and policies for each function. This type of implementation also increases the operator's operational expenses (OPEX) of system maintenance and administration. Additionally, these systems cannot scale well because they require definition of alignment rules of conflicting parameters for each SON function pair, which overlap in control parameters.

Prior art solutions do not provide an adequate solution to designing and operating effective SON systems and communications networks.

SUMMARY

The increase of a network operations complexity in mobile communication systems (MCS) results in high operational expenses (OPEX) of network operators. This has led to increased usage of self-organized or self-optimized network (SON) solutions. Self-optimization functions as applied to a heterogeneous MCS are designed to adapt network configuration to changes in user traffic and mobility patterns automatically, to provide the most efficient usage of network resources, and to ensure the best quality-of-service. Three major self-optimization functions include mobility robustness optimization (MRO), mobility load balancing (MLB) and coverage and capacity optimization (CCO). Each of these SON functions targets optimization of a specific network characteristic and is implemented based on the bottlenecks of the network and mobility patterns. MRO function targets minimizing mobility related failures happening during handover events, hence improving retainability (i.e. minimizing call/session drops) of the communication. MLB function implements adaptive balancing of the user equipment load across multiple cell towers to reduce congestion and improve utilization of the MCS. CCO function automatically improves network coverage preventing coverage holes from being created, improving accessibility of the network. Due to conflicting nature of the implementation of each of these functions, areas targeted by each of these functions should be clearly separated to avoid conflicting changes and network performance degradation.

As mentioned, one method of coordinating multiple SON functions is to separate SON functions' target areas geographically or applying strict priority rules. Such solutions, however, are unable to pin-point suitable targets for optimization of multiple SON functions to achieve best cumulative result providing only coarse-grained optimization, where only a small percentage of potential improvement is achieved. The heterogeneous nature of MCS calls for better defined selection of particular SON functions for application to achieve optimal levels of performance. In other words, this system and method addresses the problems that can arise in optimizing MCS with multiple SON functions in the same place and time where parameter conflicts can cause unwanted oscillations in a parameter if a first SON function and a second SON function are in conflict over the setting of a same parameter.

To address the above problems of coordinating the application of multiple, possibly conflicting, SON functions, the present invention describes a fine-grained, policy-based SON function coordination by using a library of predefined MCS performance and configuration related conditions, further defined as "Criteria Classes" library. Each SON optimization function includes implementation details and a configuration profile store for worst-set (i.e. target area for optimization) selection and control rules (selected SON function parameters, e.g. how aggressive SON function applies the changes). The process of selecting a subset of most-suitable candidate for optimization by a particular SON function is further referred as "filtering" and the actual conditions are referred to as "filters". Since multiple functions can end-up having same parts of MCS after the worst-set selection, cost-based weighting mechanism is shown in the present invention. Criteria Classes (CC) library is a configurable set of classification criteria that are allowed to be applied as exclusive or inclusive filter, and can also be used to calculate a scalar value which represents cost of a selected set.

In one embodiment, the present invention is directed to a method for optimizing the performance of a configurable mobile communication system (MCS) in a multi-cell network, comprising defining and encoding into a server that controls the performance of said MCS a plurality of self-optimizing network (SON) optimization functions for optimizing respective performance indicators of said MCS, wherein said SON optimization functions include at least a mobility robustness optimization (MRO) function, a mobility load balancing (MLB) function, and a coverage and capacity optimization (CCO) function; defining and encoding into said server a plurality of criteria classes in the form of an electronic criteria classes library that can be accessed by said plurality of SON optimization functions in said server, said criteria classes comprising data and instructions for identifying a set of candidate cells of said multi-cell network on which to carry out said SON optimization functions so as to improve the performance of said MCS; and defining and encoding into said server a rules-based function selector that selects a best subset of said SON optimization functions to be carried out in said candidate cells of said multi-cell network.

Another embodiment of the invention is directed to a system for automatically optimizing the performance of a mobile communication system (MCS) in a multi-cell network, comprising a server including a processor coupled to a memory storage unit and a data interface unit, the memory storage unit storing data and instructions for operating the computer and the data interface unit for exchanging data and instructions between said server and other computers coupled thereto over a data communication network; a plurality of instructions encoded into said memory storage unit including instructions representing self-optimizing network (SON) optimization functions and instructions representing an electronic criteria classes library; and a rules-based function selector including instructions encoded into said memory storage unit and including instructions configured to cause said server to automatically select a best subset of said SON optimization functions for operation on candidate cells of said multi-cell network.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

Figure 1:
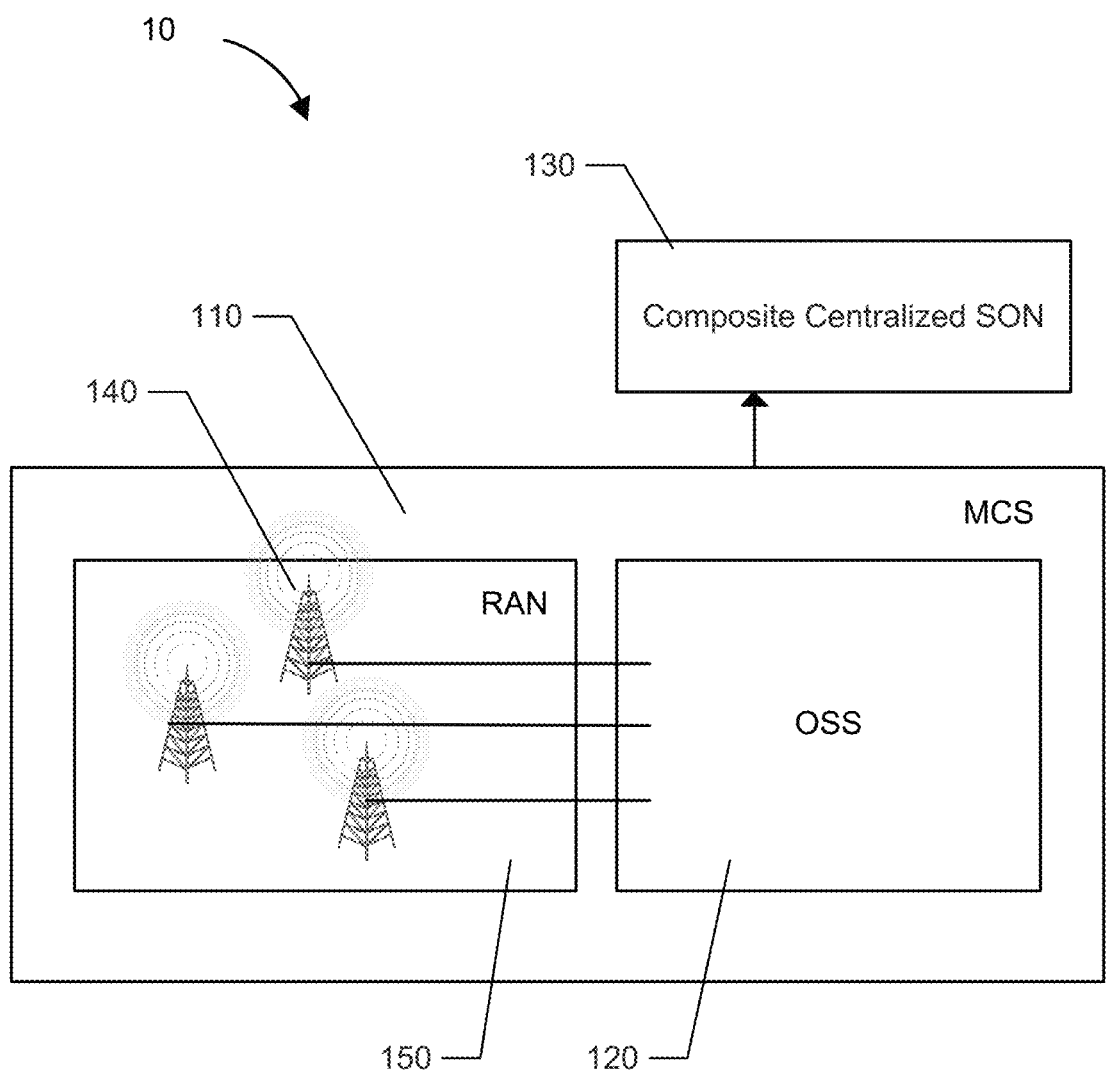
FIG. 1 schematically illustrates an exemplary MCS, including the Centralized SON Function.

The operator of the MCS is continually seeking new techniques for running their dynamic and complex networks at maximum efficiency. Performance optimization techniques for self optimizing networks (SON) in an MCS presented below include multi-dimensional (i.e., targeting more than one kind of improvement) quality optimization in the same network geographical area based on analysis of current state of the mobile network. Fine-grained optimization can be achieved according to a first aspect of the invention by applying a set of filtering criteria classes, which identify completely disjoint sets of network objects targeted by each SON function without performing a coarse geographical split. Criteria class is a simple set of formulations and conditions that return either Boolean (true/false) value or scalar (numeric) value that indicates cost of certain problem at network element. The management of criteria classes simplifies higher level management of the MCS and reduces system maintenance and administration requirements. Library of predefined criteria classes minimizes effort that SON administrator spends on configuration.

Different SON optimization functions may be run simultaneously on the same area of a mobile communication system. These functions may separately, for example, improve mobility of user devices and balance traffic load between different neighboring network elements. These functions may conflict in the application of changes to the system, one function negatively impacting the performance of the other. The Unified Criteria Classes mechanism works to prevent such conflicts by coordinating the application of such changes.

In an aspect, the operation of the SON is defined by a computer-controlled SON process. The SON process reduces, minimizes or eliminates the need for human intervention. In the ideal case, human intervention will be only required for setting target Key Performance Indicator Metrics (KPI) values to be achieved and optimization region selection. In reality, most SON function implementations either do iterative/independent optimization based on monitored KPI values (e.g. distributed SON implementations) or apply some complex decision trees and SON function alignment rules between different functions.

A novel feature of the present SON process is that, in some aspects, it provides a unified framework for multi-stage filtering of the selection of worst-set network objects based on an internal SON function rules classification. Also, in another novel aspect, it provides full abstraction of selected optimization area filtering rules from the SON function implementation details.

In situations where the optimization processes collects the appropriate KPI data or indicators, the system combines this measurement data into formulae, and evaluates the formulae according to a certain schedule to determine whether the certain network services are operating at maximum efficiency. Changes to the performance-affecting parameters will change the value of the KPI. There are typically many KPI used to determine quality levels of the network. These performance-affecting parameters interact with each other in complex ways and impact the KPI in complex ways. The optimization problem can be defined as a set of techniques to change performance-affecting parameters to achieve desired results of improving certain dimensions of performance of the MCS.

FIG. 1 illustrates the high level architecture of integration of Composite Centralized SON solution with MCS. MCS includes actual RAN equipment that is managed by OSS. When a Centralized SON solution is deployed, it communicates to OSS by sending related control commands and reading related performance metrics of the network over OSS.

Figure 2:
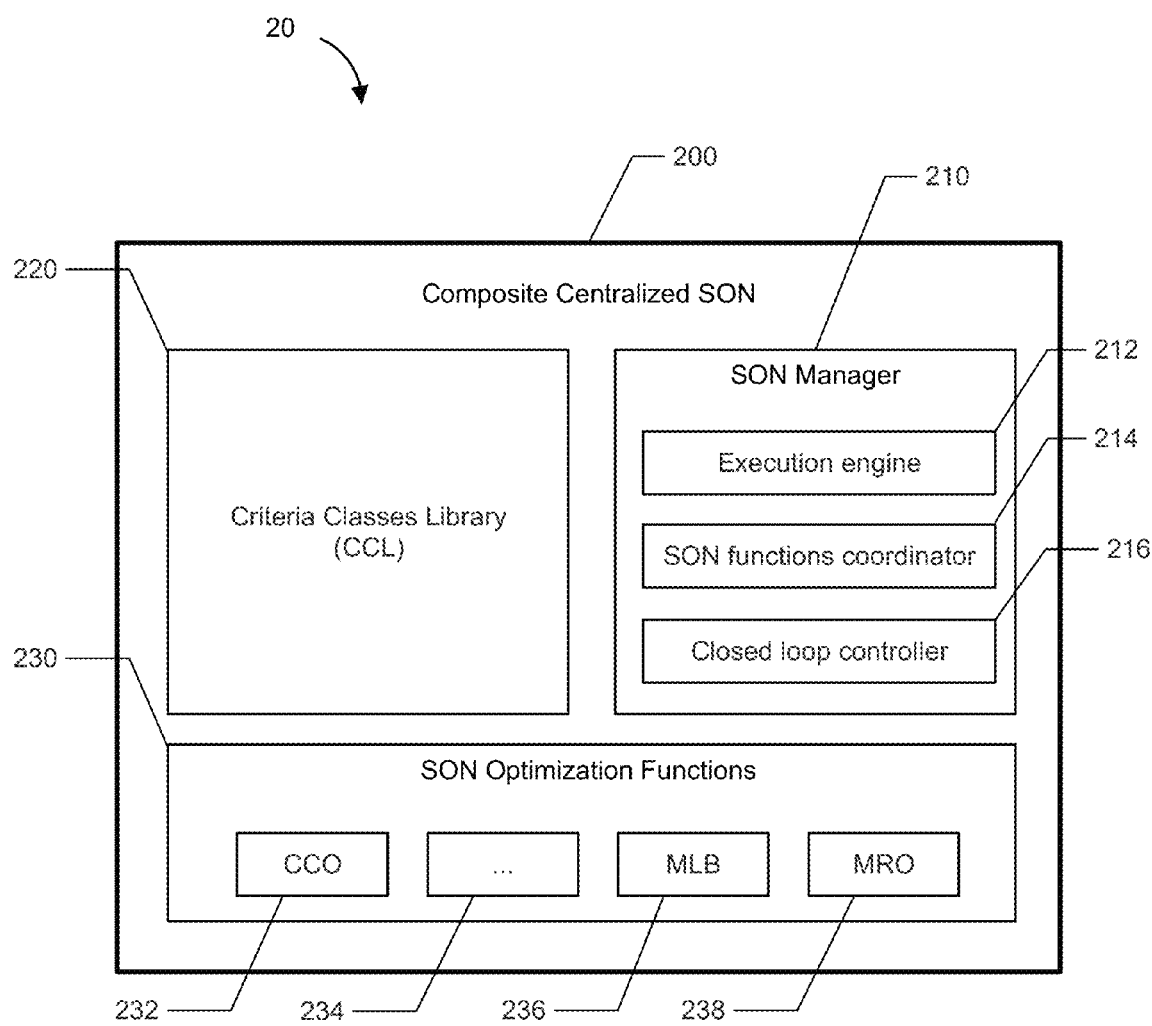
FIG. 2 illustrates an exemplary SON architecture according to one or more embodiments of the present invention.

FIG. 2 illustrates an exemplary SON architecture 60 according to one or more embodiments of the present invention. The architecture comprises a composite centralized SON 200. Composite centralized SON 200 comprises a SON manager 210, a criteria classes library (CCL) 220, and a plurality of SON optimization functions 230. The components of the architecture 20 are generally implemented in modules employing machine-readable instructions stored and executed in computer processing hardware, storage units and related communication and input/output modalities. The method of operating the system of architecture 20 may comprise preparing, programming and loading said machine-readable instructions, e.g., in SON functions coordinator 214. The method may further comprise running said executable machine-readable instructions on one or more servers or computing machines in execution engine 212 operated by the service provider or operator of the SON 200. The method may further include making changes to the parameters, functions and other aspects of the SON 200 according to the closed loop controller 216 to improve or optimize said network's performance.

The SON manager 210 plays a central role in scheduling and running the SON functions and provides a configuration interface to the upper layers of the composite centralized SON 200. In an aspect, a rules-based function selector operates in a server that manages the overall optimization of the operation and performance of the MCS in a multi-cell cellular communication network.

The SON optimization functions 230, e.g., CCO 232, MLB 236, MRO 238, and others 234 include functionality and implementation details such as a configuration profile store for worst-set selection and control rules. These aspects are encoded into a server or system for operating the MCS including a processor and a memory storage unit and a data communication unit that allows exchanging of data and instructions for programming the system.

Criteria classes library (CCL) 220 is a set of components including classification criteria that can be applied as filters or a cost-calculation functions. The final purpose of filters is to identify the so-called "worst set"—a set of network elements (cells) that can get the highest benefit from utilizing SON functions. Filters can be applied as inclusive (everything that satisfies the criteria remains in the worst-set selection) or exclusive (everything that satisfies the criteria is filtered out from worst-set selection). When used in SON Coordination function, criteria is used to calculate scalar value that represents the cost of selected subset of the MCS that can be optimized. SON functions coordinator 214 can use costs calculated for multiple SON functions to make final decision about choosing best optimization target for particular MCS subset. Finally, CCL 220 can be used by rule-based network control configuration to identify parameters of optimization that SON function will apply.

Figure 3:
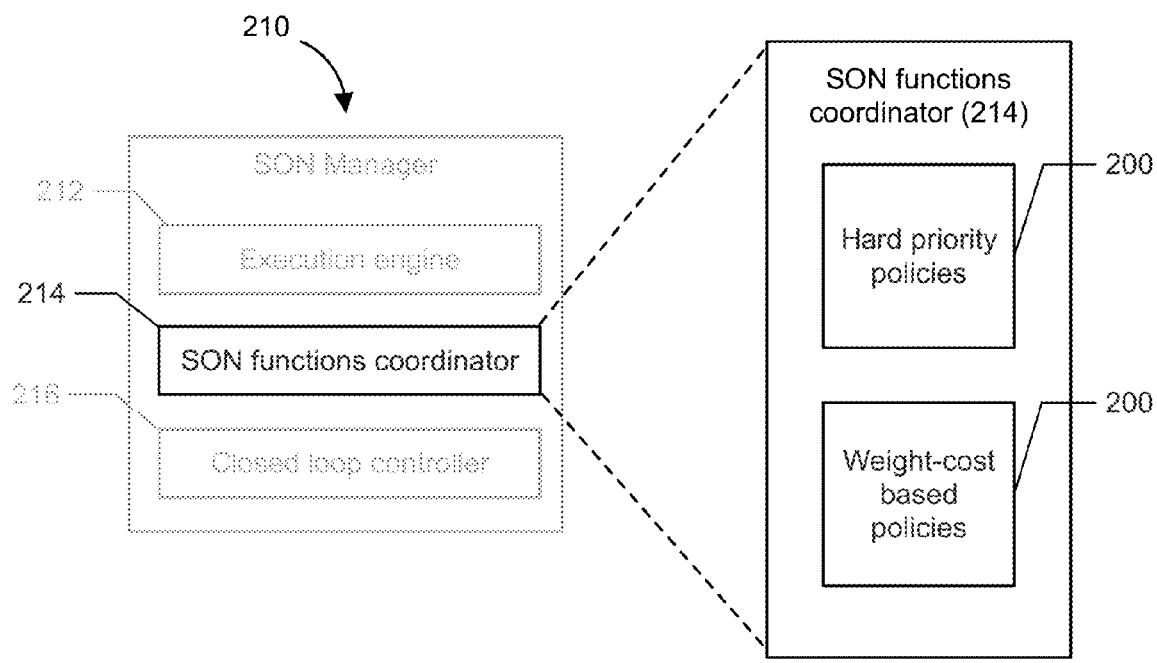
FIG. 3 illustrates an exemplary SON functions coordinator module.

FIG. 3 illustrates an exemplary configuration of the SON functions coordinator 214 of SON manager 210. SON functions coordinator 214 may include a hard priority policies module 215 and a weight-cost based policies module 217. Hard, i.e. strict, priority policies is required to allow administrator defining hard rules on optimization based on given MCS performance conditions. Example may include when a gap in coverage is above certain percentage and no other function can run, even if its potential improvement is higher. This capability allows the MCS operator to force its internal policies on SON functions coordinator 214 and avoid potential problems from seasonal effect when particular network quality index can go down due to external factors. Weight-cost based policies module is the default module that is used when there is a conflict between multiple SON functions and no hard priorities are applicable. Having a weight-cost based policy in SON functions coordinator, the calculation methodology for each SON function provides great efficiency in automated network optimization. An embodiment of the present invention promotes these efficiencies by pre-calculating potential cost improvements. These pre-calculations, performed by each SON function can be converged to input weights defined by MCS operator. Thus, the SON functions coordinator can make the optimal decision when choosing the best SON function for particular subset of network elements in the MCS.

Figure 4:
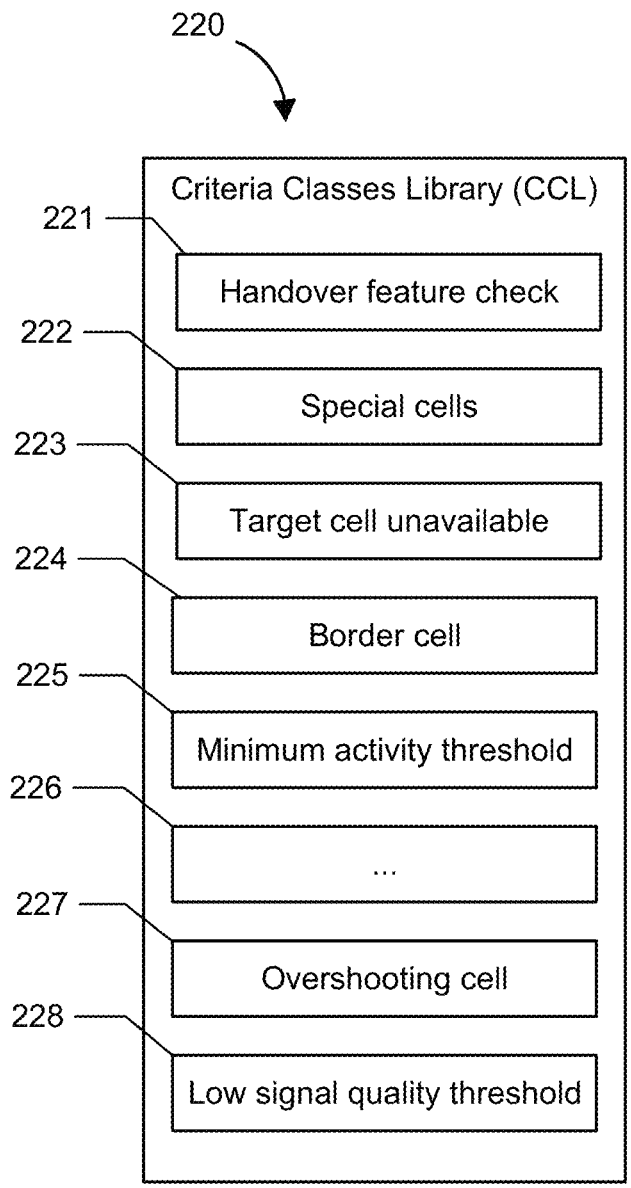
FIG. 4 illustrates an exemplary criteria classes library (CCL) according to one or more embodiments of the present invention.

FIG. 4 illustrates an example criteria classes library (CCL) 220. The library includes a number of components that are provided as an example. Handover feature check 221 Special cells 222 Target cell unavailable 223 Border cell 224 Minimum activity threshold 225_Overshooting cell 227_Low signal quality threshold 228. Special cells 222 is a filter rule that prevents running SON function on pre-defined list of cells. Minimum activity threshold 225 criteria is used to make sure that there is a certain minimum amount of network activity. The higher the network activity, the higher are the potential benefits from applying optimization in selected cells. Low signal quality threshold 228 makes sure that users under specific serving cells, have proper signal quality. This is a good example of a criteria class that is used as exclusive filter in Mobility Robustness Optimization (MRO), which does not make much sense to run in poor radio environment, and as inclusive filter in Coverage and Capacity Optimization (CCO), which targets reduction of coverage holes and improvement of signal quality in the coverage area.

Figure 5:
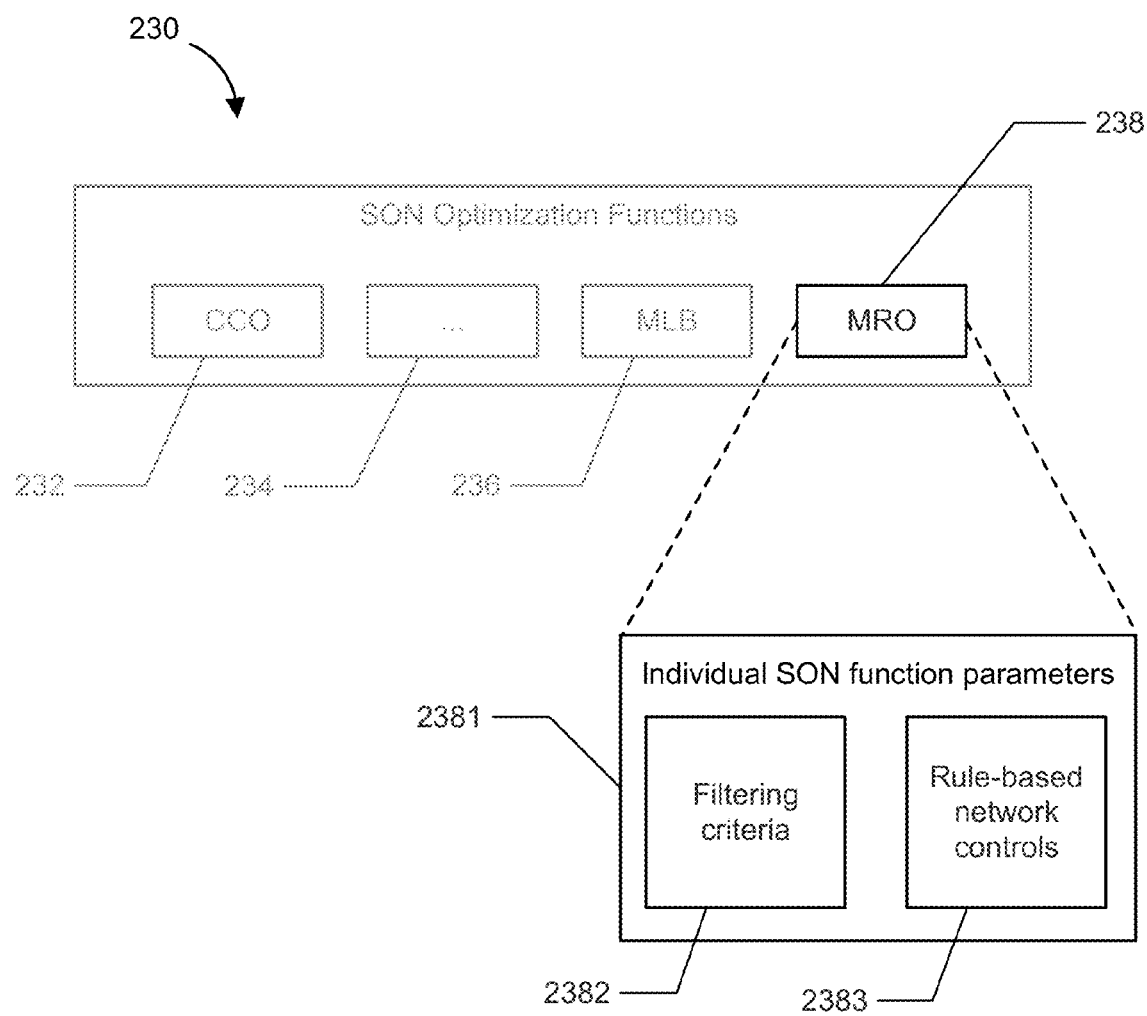
FIG. 5 illustrates exemplary parameters associated with individual SON functions, showing components used by one or more embodiments of the present invention.

FIG. 5 illustrates exemplary individual SON function parameters 2381 of a MRO 238 in the SON optimization functions modules 230 discussed earlier. The SON function parameters 2381 comprise, for example, filtering criteria 2382. Filtering criteria includes set of criteria classes from CCL that filter out all cells except those having poor performance in terms of mobility and have no operational or signal quality problems. The SON function parameters 2381 of MRO 238 also includes rule-based network controls 2383. After worst-set has been identified by filtering criteria, rule-based network control divides it into multiple categories, each mapped to a certain optimization methods, based on the potential reason for poor mobility.

Figure 6:
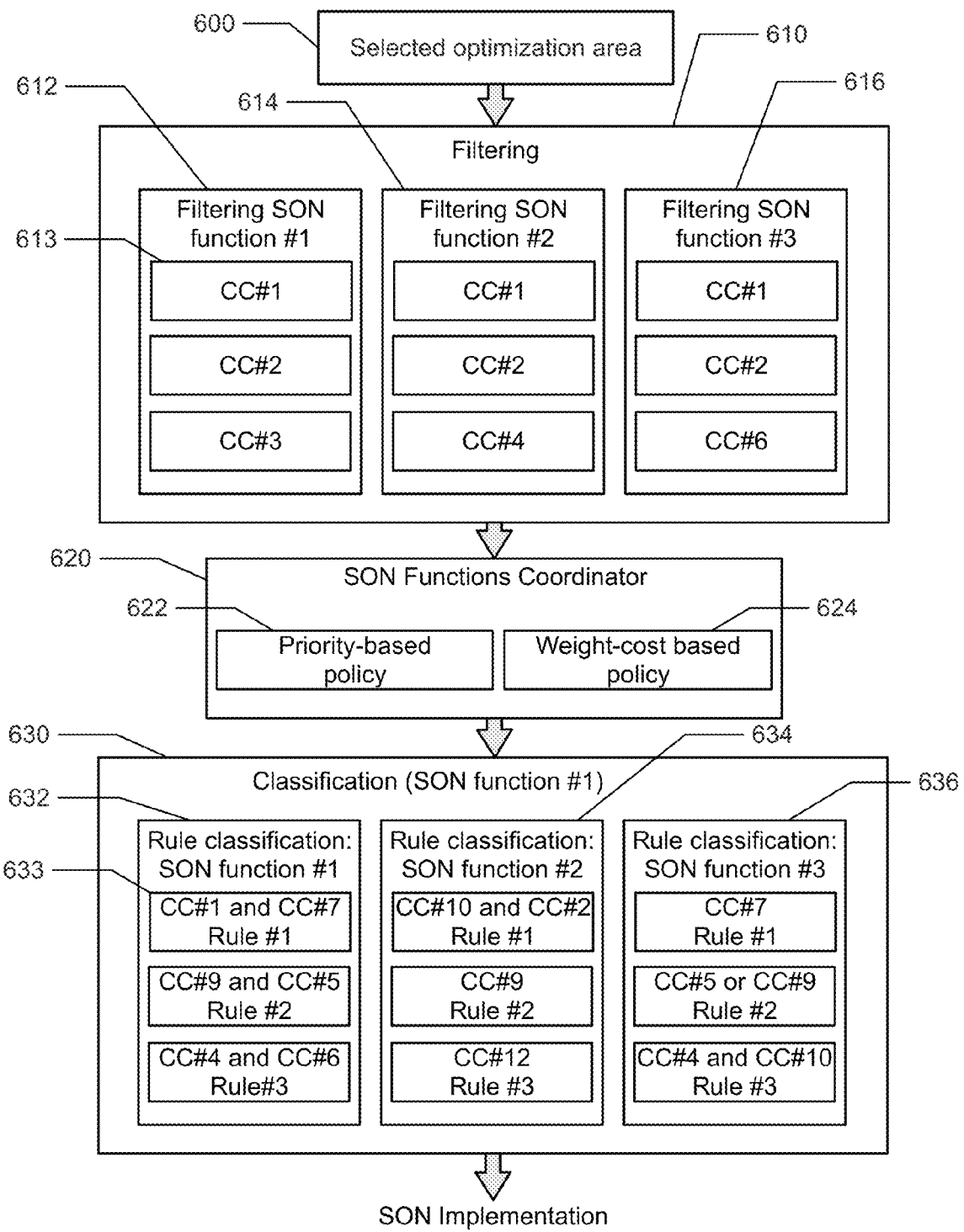
FIG. 6 illustrates an exemplary method and architecture for obtaining a SON implementation using filtering functions and criteria classes.

FIG. 6 illustrates an exemplary method and architecture for obtaining a SON implementation using filtering functions and criteria classes. The method considers a selected optimization area 600, which can include a group of cells in a cellular communication MCS. A region or cluster of cells can be determined at 600. The SON operator can specify the desired optimization area and the process can be run on a predetermined schedule with filters and rules profiles as disclosed herein. In an aspect, each profile can map a SON function to a filter and rule classification set. Criteria classes (CC) are exploited by the SON functions, which can include criteria such as: "Minimum Handover Activity Threshold"; "Height Threshold"; "Special cells (VIP)"; "Radio Link Failures" exceeding a predetermined percentage threshold; "High Network Load"; "Operational Problems" or "Top Percentage Call Drops".

A first filtering stage 610 includes a plurality of SON filtering functions (filtering SON function #1 612, #2 614 and #3 616, respectively. Each filtering SON function 612, 614, 616 includes one or more criteria classes 613, the number and nature of which are not limited but are any such criteria classes that meet the operator's needs. During the filtering stage each individual filtering step may be based on defined CCs and performed for each SON function.

For example, according to the present rule classification, SON function #1 can include criteria classes CC#1, CC#2 and CC#3; SON function #2 can include criteria classes CC#1, CC#2 and CC#4; while SON function #3 can include criteria classes CC#1, CC#2 and CC#6. Each criterion class (CC) can use cell or relational performance configurations or fault management information in its calculation and provide generic arithmetic and statistical functions for computing a scalar cost function, which represents a number identifying scale of a problem observed in the cellular MCS, or Boolean condition, which represents a filtering rule identifying whether a particular cell should be or should not be selected for optimization. In one aspect, each CC can include multiple conditions merged by Boolean logic operators (e.g., AND, OR, XOR, others) so that the CC is the smallest building block component for a SON parameter specification. When used in worst-set selection filtering rules, the conditional Boolean output is used as an inclusive or exclusive filter. When used in conflict resolution, the cost is used to identify the SON function that is more beneficial for current network conditions. In another aspect, in a rule-set both the cost value and a single logical output can be used as part of a complex logical expression. Worst sets for each SON function are determined and output from filtering stage 610. Worst set identification ensures maximum efficiency of the selected SON functions.

In another embodiment, the filtering SON function coordinator 620 includes policies that are used to make a final decision about which SON function should be run on which cells. Hard priority based policy 622 makes sure certain SON functions rules are never violated disregarding the status of MCS performance. One simple rule can be "never to apply MRO functions on certain special cells if there is other potential SON function that can be applied" on the network, so even if special cells have very poor mobility performance indicators, MRO won't be selected as their optimization function as long as there is another potential improvement that can be performed by MLB or CCO. After applying priority-based rules, if overlap in the worst-set areas is still present, the cost of each set is calculated for each SON function and the function having higher potential benefit will be selected for running on subsets conflicting cells. This process can be overridden by the administrator to give a hard priority to certain SON functions. For example, if a network is suffering from severe coverage issues, a CCO function can be given an elevated priority, by either defining hard priority rule or applying static multiplier to a cost function calculation of CCO, to ensure that CCO always runs for all network objects filtered as cells that could be improved by CCO.

Once the worst sets are determined for each SON function the SON the system proceeds to classification of SON function #1 at stage 630. The classification stage 630 operates on the filtering SON functions 632, 634 and 636. This stage provides a differential approach to parameter tuning based on how bad the performance of the worst set is. For example, if relation "Radio Link Failure Greater Than x" and "Handover Too Late Greater Than y" for threshold values x and y, then Cell Individual Offset can be increased by a certain number of decibels (e.g., 2 dB) to ensure earlier handover is triggered.

In an aspect, specifying different criteria rules allows fine tuning of the network optimization process. Also, monitoring feature SON function implementation can cover incorrect rule setting scenarios when network performance is degraded after a change is applied.

Each filtering SON function can apply a plurality of criteria classes and rules as can be seen in the example of FIG. 6. The same criterion, criteria classes and/or rules 633 can be applied in one or more filtering SON functions as needed. The output of the process of FIG. 6 is provided to a SON implementation in the form of data, signals and information.

In an aspect, rule classification criteria allow an understanding of the severity of a problem in the SON and allow identification and configuration of the parameters to be tuned for best network performance. After determining the worst-set and classifying the same using the present rules approach, each rule can be sent to the SON function unit to perform the assigned network optimization feature associated therewith. This permits fine-grained network optimization in multiple dimensions or degrees of freedom. The benefits include lower operating overhead on signaling and back-haul.

In an embodiment of the present invention, a predefined and parameterized library of criteria classes makes the configuration of the filtering and rule classification stages simpler and requires less human intervention to maintain the network.

The steps herein can be combined or further divided into sub-processes as suits a given application, and some simplification and generalization is inevitable for the sake of disclosure. Nonetheless, those skilled in the art would appreciate a number of aspects by the present disclosure and exemplary embodiments. In an aspect, it is understood that the above steps could be carried out fully or partially automatically in or by a machine such as a computer or processing apparatus. Typically, such a machine would have circuitry and carry or be adapted to execute stored machine-readable instructions (sometimes encoded into transitory or non-transitory data storage and memory units). In addition to processing and data storage capability, the machine would also typically be equipped with network communication functionality such as input/output ports for receiving and sending electronic signals over such a network. In some aspects, the Internet could be such a network. In other aspects, a wired or wireless telephony network could be connected thereto.

Furthermore, in another embodiment of the present invention, a user interface may be included in the system so that human or non-human users can provide and receive information exchanged with the system. The user interface can include visual and/or audible outputs indicative of relevant information being presented by the system. Also, a further aspect allows alarm units to signal some pre-determined condition or programmed alarm criterion can be included in the hardware or software of the system. In yet another aspect, a database unit can be included with or be accessible to the system in which data is stored such as detailed measurement result. Data tracking performance and robustness, and other data that can be used for future learning or programming of the system.

So having described in detail several aspects of the present method and system it can be appreciated that the present invention permits automated multi-function and multi-parameter optimization in a mobile communication system (MCS), especially self optimizing networks (SON). More particularly, the present technique allows for simultaneous optimization of multiple SON functions and parameters in a complex system, both simultaneously treated in space (geography) and in time. The technique allows resolution of conflicts among multiple SON functions where oscillations of parameter values could occur if the functions were separately implemented. Also, by using a SON functions coordinator, rule classifications and universal criteria classes organized into criteria classes libraries (CCL) as described, the overall operation of the MCS is optimized at a low operating cost to the network operator. The effects of worst performing cells are taken into account. Also, the optimization is suitable for fine granularity.

Therefore, the present system and method in various embodiments have a number of inventive features, some or all of which can improve the performance and robustness of a MCS. The present concepts can further be embodied in hardware and/or software so that it forms an automated closed-loop means for determining an optimum set of conditions for operating a SON to increase the quality of the network, reduce dropped calls, improve handoff behavior, and other advantages.

Criteria classes can be used by (i) SON function filtering, (ii) a rule-based network control configuration, and (iii) a weighted-cost based calculation used by the SON functions coordinator. These classes are later assembled into a set of rules for identifying the target area and identifying the action of a SON function. Combining rules into criteria classes provides configuration reuse and higher level abstraction. It also allows any combination of filtering classes for certain SON function under a selected profile.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications and equivalents.

What is claimed is:

1. A method for optimizing the performance of a configurable mobile communication system (MCS) in a multi-cell network, comprising:
    defining and encoding into a server that controls the performance of said MCS a plurality of self-optimizing network (SON) optimization functions for optimizing respective performance indicators of said MCS, wherein said SON optimization functions include at least a mobility robustness optimization (MRO) function, a mobility load balancing (MLB) function, and a coverage and capacity optimization (CCO) function;
    defining and encoding into said server a plurality of criteria classes in the form of an electronic criteria classes library that can be accessed by said plurality of SON optimization functions in said server, said criteria classes comprising data and instructions for identifying a set of candidate cells of said multi-cell network on which to carry out said SON optimization functions so as to improve the performance of said MCS; and
    defining and encoding into said server a rules-based function selector that selects a best subset of said SON optimization functions to be carried out in said candidate cells of said multi-cell network.

2. The method of claim 1, further comprising automatic optimization of the performance of said MCS by said server without human intervention to simultaneously optimize a common parameter used in more than one of said subset of SON optimization functions so that the simultaneous optimization would render an improved performance of said MCS even though separately optimizing one such SON optimization function on its own would conflict with a best setting of another such SON optimization function.

3. The method of claim 2, said automatic optimization comprising determining an optimum value of the common parameter and further comprises preventing said common parameter from oscillating or hunting due to said conflict among the subset of SON functions.

4. The method of claim 2, said multi-cell network comprising a plurality of mobile communication cells in a given geographic area, said step of automatic optimization comprising determining an optimum value of said common parameter over an entirety of said geographic area.

5. The method of claim 1, further comprising determining a priority-based policy by said rules-based function selector so as to select said best subset of SON optimization functions.

6. The method of claim 1, further comprising determining a weight-cost based policy by said rules-based function selector so as to select said best subset of SON optimization functions.

7. A system for automatically optimizing the performance of a mobile communication system (MCS) in a multi-cell network, comprising:
    a server including a processor coupled to a memory storage unit and a data interface unit, the memory storage unit storing data and instructions for operating the computer and the data interface unit for exchanging data and instructions between said server and other computers coupled thereto over a data communication network;
    a plurality of instructions encoded into said memory storage unit including instructions representing self-optimizing network (SON) optimization functions and instructions representing an electronic criteria classes library; and a rules-based function selector including instructions encoded into said memory storage unit and including instructions configured to cause said server to automatically select a best subset of said SON optimization functions for operation on candidate cells of said multi-cell network.

* * * * *